US008726977B2

(12) United States Patent
Rose

(10) Patent No.: US 8,726,977 B2
(45) Date of Patent: May 20, 2014

(54) PRESSURE VESSEL ASSEMBLY FOR INTEGRATED PRESSURIZED FLUID SYSTEM

(75) Inventor: Kenric Rose, Howell, MI (US)

(73) Assignee: Bosch Rexroth Corporation, Hoffman Estates, IL (US)

(*) Notice: Subject to any disclaimer, the term of this patent is extended or adjusted under 35 U.S.C. 154(b) by 131 days.

(21) Appl. No.: 13/272,868

(22) Filed: Oct. 13, 2011

(65) Prior Publication Data

US 2012/0031911 A1 Feb. 9, 2012

Related U.S. Application Data

(62) Division of application No. 10/572,908, filed as application No. PCT/US2004/030968 on Sep. 22, 2004, now Pat. No. 8,079,408.

(60) Provisional application No. 60/504,188, filed on Sep. 22, 2003.

(51) Int. Cl.
*F28D 7/00* (2006.01)
*F16D 31/02* (2006.01)

(52) U.S. Cl.
USPC .............................. 165/141; 165/154; 138/30

(58) Field of Classification Search
USPC ........... 165/10, 140, 141, 157, 158, 163, 110, 165/186; 138/26, 30; 137/262, 264, 538; 60/414, 415, 416, 478, 477
See application file for complete search history.

(56) References Cited

U.S. PATENT DOCUMENTS

| | | | | | |
|---|---|---|---|---|---|
| 1,692,670 | A | * | 11/1928 | Le Mesurier | 220/585 |
| 2,106,263 | A | | 1/1938 | Winter | |
| 2,492,014 | A | | 12/1949 | Spalding | |
| 2,595,685 | A | | 5/1952 | Mallory | |
| 2,815,036 | A | * | 12/1957 | De Matteo | 137/120 |
| 2,822,136 | A | | 2/1958 | Dalin | |
| 2,847,193 | A | | 8/1958 | Carter | |
| 3,230,975 | A | | 1/1966 | Mercier | |
| 3,448,792 | A | | 6/1969 | Lawrence | |
| 3,492,461 | A | | 1/1970 | Lawrence | |
| 3,791,766 | A | | 2/1974 | Kikutsugi et al. | |
| 4,025,055 | A | * | 5/1977 | Strolenberg | 254/277 |
| 4,037,650 | A | | 7/1977 | Randall | |

(Continued)

FOREIGN PATENT DOCUMENTS

| | | |
|---|---|---|
| DE | 553586 | 6/1932 |
| DE | 1280507 | 10/1968 |

(Continued)

*Primary Examiner* — Tho V Duong
(74) *Attorney, Agent, or Firm* — Berenato & White, LLC

(57) ABSTRACT

Pressure vessel assembly for a pressurized fluid system, comprises an enclosed outer casing, at least one internal tube extending within the casing, at least one fluid accumulator disposed within the at least one internal tube, and at least one cooling passage provided within the at least one internal tube and defined by a clearance between the at least one hydraulic fluid accumulator and the at least one internal tube. The pressure vessel assembly further includes a fluid storage compartment formed between the outer casing and the at least one internal tube. The fluid storage compartment is at least partially filled with a working fluid. The pressurized fluid system also includes a cooling fan allowing forced airflow through the cooling passage for forced cooling of the at least one hydraulic fluid accumulator and the working fluid in the storage compartment of the pressure vessel assembly.

7 Claims, 6 Drawing Sheets

(56) References Cited

U.S. PATENT DOCUMENTS

| | | | | |
|---|---|---|---|---|
| 4,052,852 | A | | 10/1977 | Hart |
| 4,062,356 | A | | 12/1977 | Merrifield |
| 4,091,897 | A | * | 5/1978 | Andrepont .................... 188/314 |
| 4,188,787 | A | | 2/1980 | Bromell et al. |
| 4,367,786 | A | | 1/1983 | Hafner et al. |
| 4,380,150 | A | | 4/1983 | Carlson |
| 4,385,909 | A | | 5/1983 | Starr |
| 4,520,840 | A | | 6/1985 | Michel |
| 4,671,325 | A | | 6/1987 | Otter |
| 4,760,697 | A | * | 8/1988 | Heggie et al. ................... 60/408 |
| 4,836,511 | A | * | 6/1989 | Buma et al. ................ 267/64.16 |
| 5,088,041 | A | * | 2/1992 | Tanaka et al. ................... 701/70 |
| 5,127,441 | A | | 7/1992 | Rains |
| 5,402,844 | A | | 4/1995 | Elluin et al. |
| 5,469,701 | A | | 11/1995 | Sneddon et al. |
| 5,494,083 | A | | 2/1996 | Elmore |
| 5,893,995 | A | | 4/1999 | Waters |
| 5,918,760 | A | | 7/1999 | Frodin et al. |
| 6,029,741 | A | | 2/2000 | Yokogi et al. |
| 6,158,234 | A | | 12/2000 | Szutu |
| 6,433,316 | B1 | | 8/2002 | Sigety et al. |
| 6,503,584 | B1 | | 1/2003 | McAlister |
| 6,519,950 | B2 | | 2/2003 | Pelloux-Gervais et al. |
| 2003/0070434 | A1 | | 4/2003 | Shimada et al. |

FOREIGN PATENT DOCUMENTS

| | | |
|---|---|---|
| DE | 2222587 | 11/1973 |
| DE | 19711841 | 12/1998 |
| DE | 10041131 | 3/2002 |
| EP | 0047336 | 3/1982 |
| JP | 49075154 | 6/1974 |
| JP | 05032974 | 2/1993 |
| JP | 49085615 | 8/1994 |
| JP | 06294566 | 10/1994 |
| JP | 07024295 | 1/1995 |

* cited by examiner

PRESSURE VESSEL ASSEMBLY FOR INTEGRATED PRESSURIZED FLUID SYSTEM

CROSS-REFERENCE TO RELATED APPLICATION

This application claims the benefit under 35 U.S.C. 119(e) of U.S. Provisional Application No. 60/604,188 filed Sep. 22, 2003 and International Patent Application No. PCT/US2004/030968 filed Sep. 22, 2004 and is a divisional of U.S. patent application Ser. No. 10/572,908 filed Mar. 21, 2006 now U.S. Pat. No. 8,079,408 by Kenric Rose. All applications are incorporated herein by reference.

BACKGROUND OF THE INVENTION

1. Field of the Invention

The present invention relates to integrated pressurized fluid systems in general, such as for hydraulic regenerative drive systems, and, more particularly, to an integrated pressurized fluid system including a pressure vessel assembly containing at least one hydraulic fluid accumulator.

2. Description of the Prior Art

In conventional integrated pressurized fluid systems the recovered energy is normally accumulated in flywheel accumulators, in electrochemical batteries or in hydraulic fluid accumulators. The latter are of known technology and, in comparison with the other recovery and accumulation arrangements, they are more flexible in use, notably in connection with a vehicular transmission to which they are connected. On the other hand they remain less efficient in terms of mass and volume and consequently raise serious problems for fitting onto motor vehicles. In addition to penalizing the energy savings obtained, these problems of dead weight and bulk lead to high costs linked either with the hydraulic fluid accumulator itself or, mainly, with the modifications that have to be made to the vehicle to fit the accumulator. The result is that the motor vehicles equipped with the hydraulic fluid accumulator are no longer standard in any way and are therefore much more expensive to produce and maintain and that, furthermore, the equipment used for this installation cannot be transposed to another vehicle or modulated in size, which increases the overall cost of such an installation.

Accordingly, it is the intent of this invention to overcome these shortcomings of the prior art by providing a compact pressure vessel assembly combining all the accumulation functions and capable of being fitted without any substantial modification to various types of pressurized fluid systems, including standard motor vehicles equipped with hydraulic regenerative drive system designed for charging and discharging the hydraulic fluid accumulators.

SUMMARY OF THE INVENTION

The present invention provides a pressure vessel assembly for use in an integrated pressurized fluid system, such as for a hydraulic regenerative drive system.

The pressure vessel assembly of the present invention comprises an enclosed outer casing, at least one internal tube extending within the casing, at least one fluid accumulator disposed within the at least one internal tube, and at least one cooling passage provided within the at least one internal tube and defined by a clearance between the at least one hydraulic fluid accumulator and the at least one internal tube. The pressure vessel assembly further includes a fluid storage compartment formed within the outer casing outside the at least one internal tube. The fluid storage compartment is at least partially filled with a working fluid, such as oil.

The pressurized fluid system Of the present invention includes a cooling fan allowing forced airflow through the cooling passage for forced cooling of the at least one hydraulic fluid accumulator and the working fluid in the storage compartment of the pressure vessel assembly.

The pressurized fluid system of the present invention further includes a pressurized gas reservoir external to the outer casing so that the pressurized gas reservoir is in fluid communication with the compartment within the outer casing for pressurizing the working fluid within the compartment in the outer casing.

Moreover, according to the preferred embodiment of the present invention, the hydraulic fluid accumulator is placed inside the internal tube, centered and spaced inside the internal tube with at least one spiral wrapping around the hydraulic fluid accumulator.

Furthermore according to the preferred embodiment of the present invention, the outer casing of the pressure vessel includes a substantially tubular housing and end members secured at opposite distal ends of the housing.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
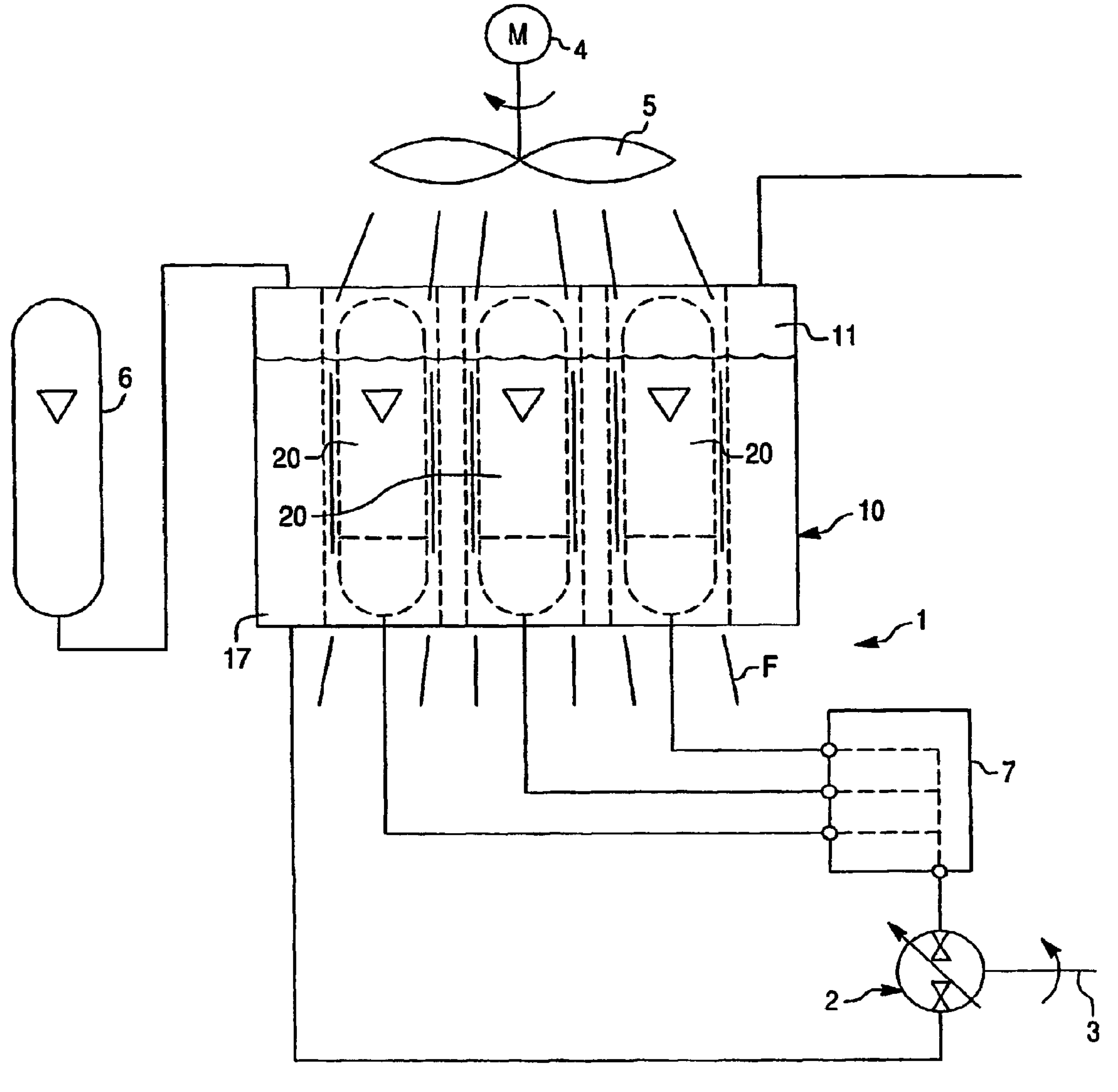
FIG. 1 is a schematic view of an integrated pressurized fluid system in accordance with the present invention.

FIG. 1 schematically depicts an integrated pressurized fluid system, such as for a hydraulic regenerative drive system. However, it is to be understood that while the present invention is described in relation to the hydraulic regenerative drive system, the present invention is equally suitable for use in any appropriate pressurized fluid system.

As illustrated in FIG. 1, the integrated pressurized fluid system 1 in accordance with the preferred embodiment of the present invention comprises a pressure vessel assembly 10, and a motor/pump 2 in fluid communication with the pressure vessel assembly 10. An external source of the kinetic energy (not shown) is drivingly connected to the motor/pump 2 through a drive shaft 3.

Preferably, the motor/pump 2 is a positive displacement, reversible hydraulic unit, such as a high-pressure hydraulic piston machine that functions both as hydraulic pump and hydraulic motor when reversed. Alternatively, the motor/pump 2 is a variable-displacement hydraulic unit. It will be appreciated that any appropriate hydraulic motor/pump unit is within the scope of the present invention. In the application for the hydraulic regenerative drive system of a motor vehicle (not shown), the motor/pump 2 is connected to a driveline of the motor vehicle through the drive shaft 3.

As further illustrated in FIG. 1, the pressure vessel assembly 10 houses at least one, but preferably a plurality of hydraulic fluid accumulators 20 and defines a working fluid storage compartment 11 therewithin at least partially filled with a working hydraulic fluid 17, such as oil, at either atmospheric, or low-pressure. It will be appreciated that any appropriate type of the hydraulic fluid accumulators may be employed. Preferably, the hydraulic fluid accumulators 20 are hydro-pneumatic accumulators known in the art. Each of the hydro-pneumatic accumulators 20 has a communication port 21 connected to the motor/pump 2, and a gas charging port 23.

Further preferably, the hydraulic fluid 17 in the storage compartment 11 of the pressure vessel assembly 10 is at low-pressure created by an external pressurized gas reservoir 6 fluidly communicating with the storage compartment 11, as illustrated in FIG. 1. Preferably, the external pressurized gas reservoir 6 is in the form of a low-pressure gas accumulator or a gas bottle containing an appropriate gas under pressure. Thus, the storage compartment 11 of the pressure vessel assembly 10 makes up a low-pressure accumulator connected to the motor/pump 2. Further preferably, the pressure vessel assembly 10 houses three hydraulic fluid accumulators 20 fluidly connected to the motor/pump 2. As further shown in FIG. 1, the motor/pump 2 is fluidly connected to both the hydraulic fluid accumulators 20 through a distribution block 7 and to the storage compartment 11 of the pressure vessel assembly 10.

Figure 2:
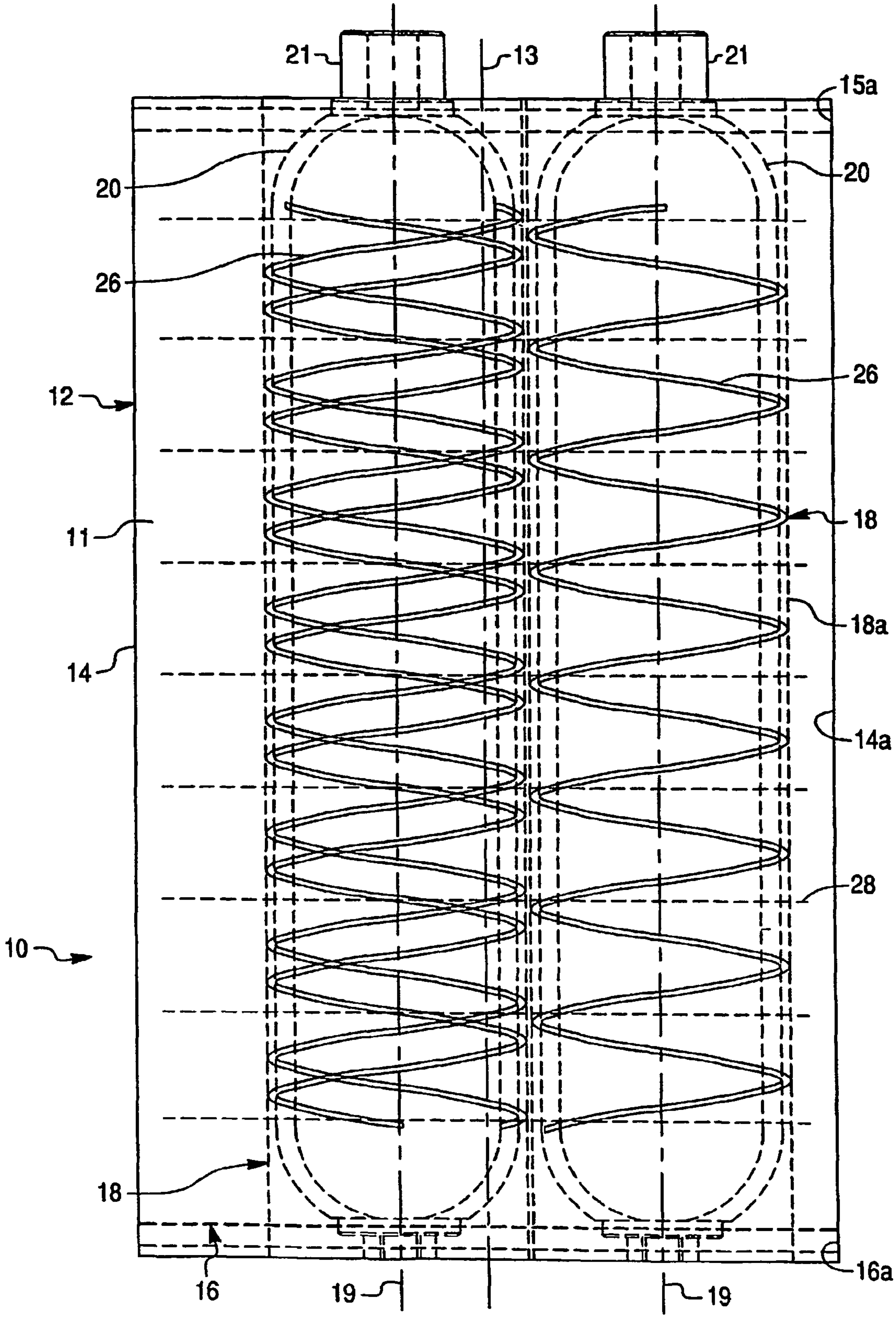
FIG. 2 is a cross sectional view of a pressure vessel assembly in accordance with the preferred embodiment of the present invention.
Figure 3:
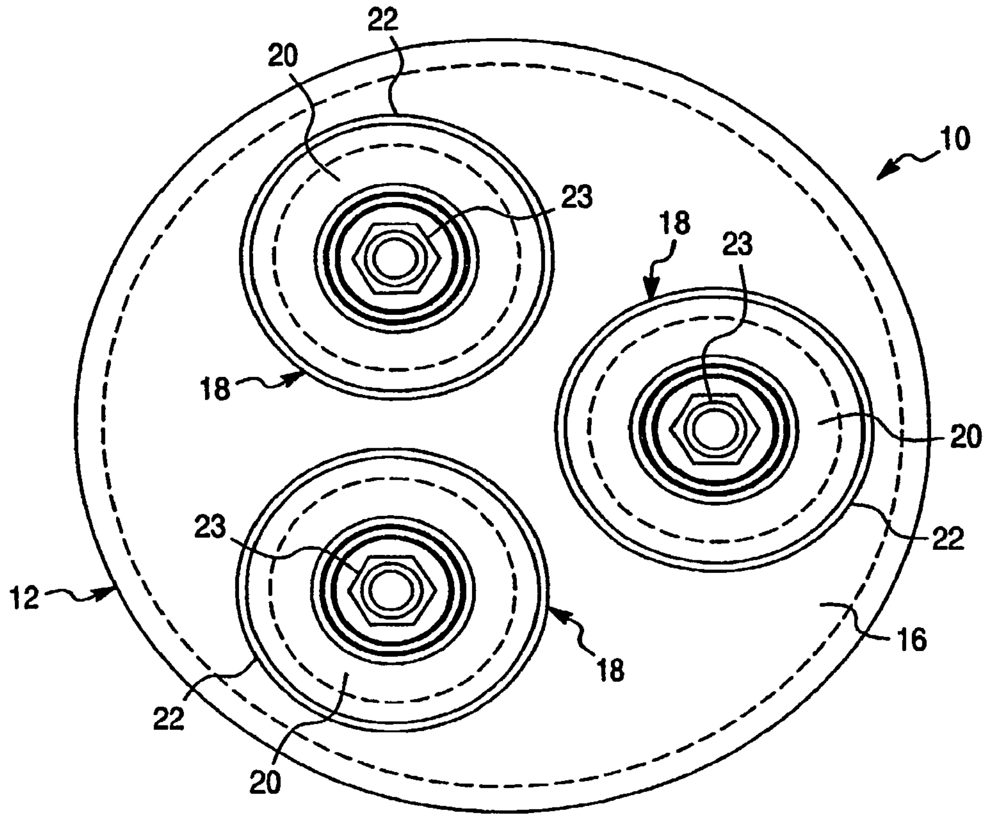
FIG. 3 is a rear view of the pressure vessel assembly in accordance with the preferred embodiment of the present invention.
Figure 4:
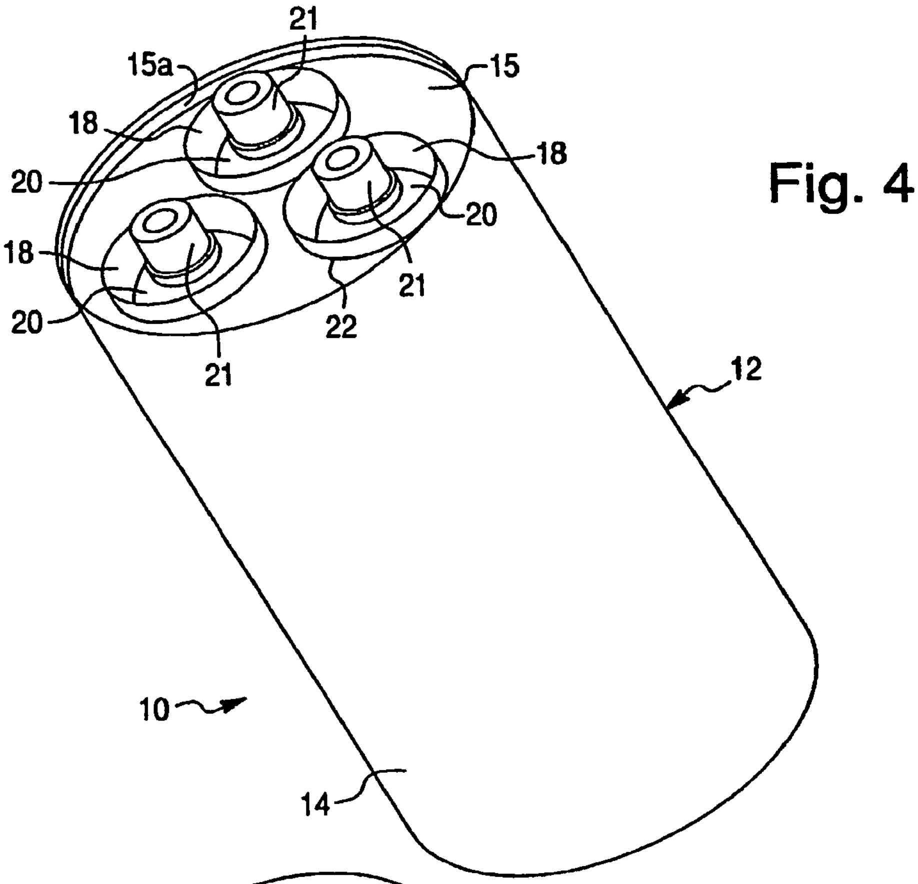
FIG. 4 is a perspective view from the front of the pressure vessel assembly in accordance with the preferred embodiment of the present invention.
Figure 5:
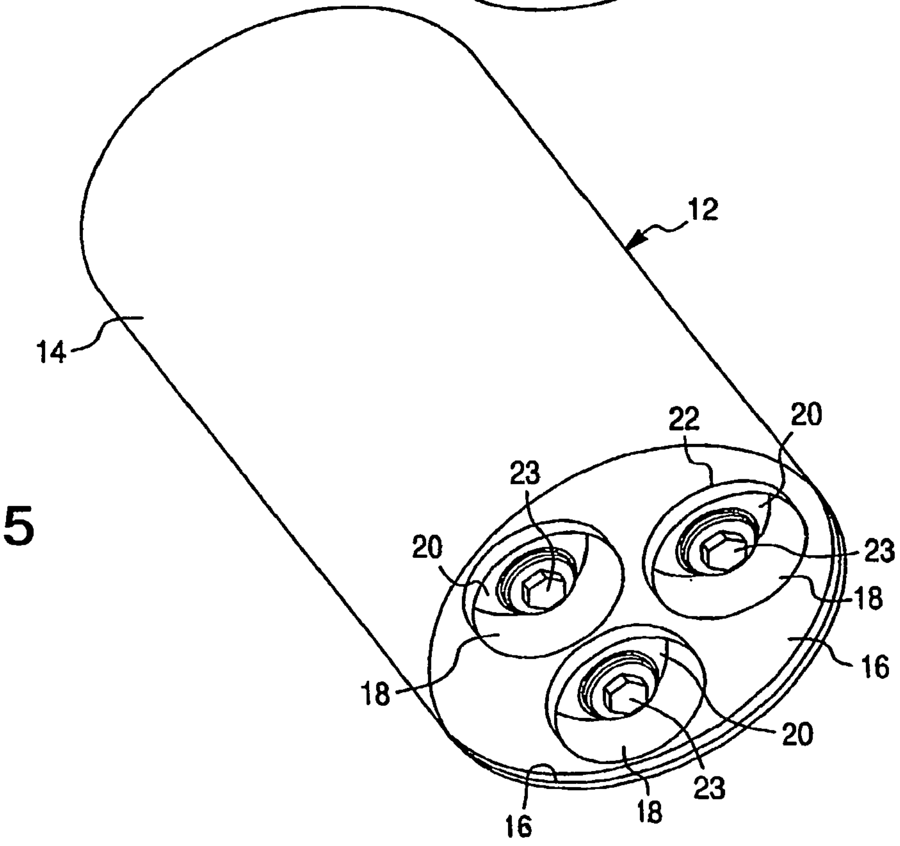
FIG. 5 is a perspective view from the rear of the pressure vessel assembly in accordance with the preferred embodiment of the present invention.

The pressure vessel assembly 10, shown in detail in FIGS. 2-5, comprises an enclosed outer casing 12 housing the fluid accumulators 20. The outer casing 12 includes a tubular, preferably a substantially cylindrical, housing 14 having a central axis 13 and opposite end members 15 and 16. Alternatively, the tubular housing 14 may have oval, rectangular, square, or any other appropriate cross-section. Preferably, the end members 15 and 16 are in the form of substantially flat plates provided with flanges **15*a* and 16*a*, respectively, as shown in FIGS. 2, 4 and 5, which are firmly secured to opposite distal ends of the housing 12, such as by welding, so as to be leak tight to a desired pressure rating of the pressure vessel assembly 10. The pressure vessel assembly 10 is designed such that the material thickness of the housing 12 and welds are sufficient to contain a working pressure of the hydraulic fluid 17 in the storage compartment 11 within the outer casing 12 of the pressure vessel assembly 10** with an appropriate safety factor.

The outer casing 12 of the pressure vessel assembly 10 is further provided with a plurality of smaller diameter, cylindrical internal tubes 18 secured therewithin. Each of the plurality of the cylindrical internal tubes 18 has a longitudinal axis 19 substantially parallel to the central axis 13 of the cylindrical housing 14 and is sized to receive one of the hydraulic fluid accumulators 20 that fit inside the internal tube 18 with a nominal clearance. The clearance between the hydraulic fluid accumulator 20 and the internal tube 18 defines a cooling passage for receiving a flow of an appropriate cooling fluid, such as air, therethrough for cooling the hydraulic fluid accumulator 20 and the working hydraulic fluid within the storage compartment 11 of the pressure vessel assembly 10. Preferably, the nominal clearance is on the order of one-quarter of an inch.

Further preferably, the internal tubes 18 have substantially the same length as the housing 12 and extend through the flat end members 15 and 16. All the internal tubes 18 are assembled such that their ends are flush. In order to achieve this, corresponding circular holes 22 are punched in each of the end members 15 and 16 of the pressure vessel assembly 10 to accommodate the internal tubes 18. Thus, the working fluid storage compartment 11 is defined by a space between an inner peripheral surface **14*a* of the cylindrical housing 14, an outer peripheral surface 18*a* of the internal tubes 18, and the end members 15 and 16**.

Figure 6:
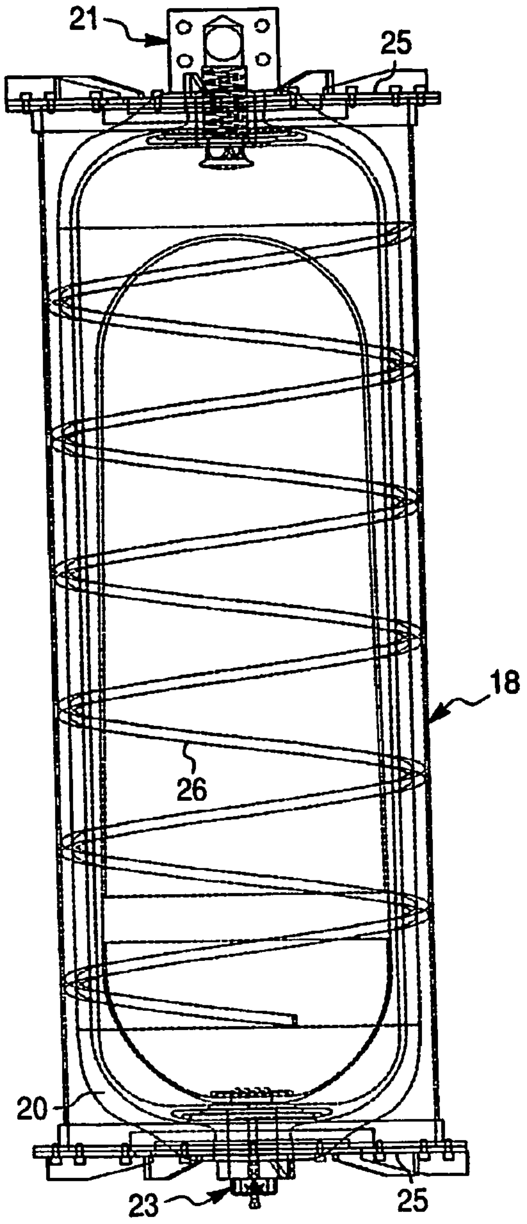
FIG. 6 is a cross sectional view of an internal tube containing a hydro-pneumatic accumulator in accordance with the preferred embodiment of the present invention.
Figure 7:
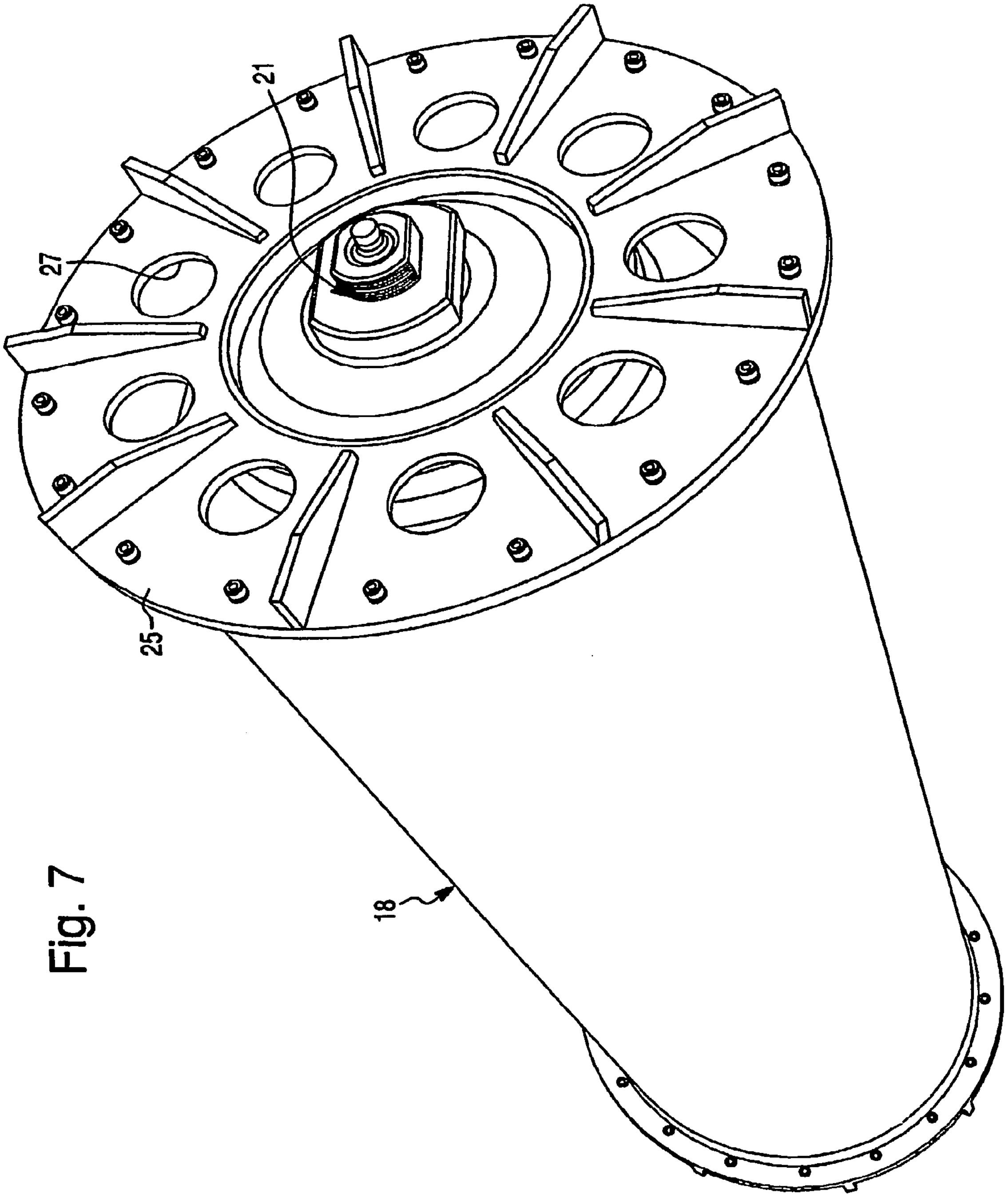
FIG. 7 is a perspective view from the front of the internal tube with a perforated cover member in accordance with the preferred embodiment of the present invention.

The hydraulic fluid accumulators 20 are secured within the internal tubes 18 of the pressure vessel assembly 10 by any appropriate means known to those skilled in the art. By way of example, distal ends of the internal tubes 18 may be closed with perforated circular cover members 25 (shown in FIGS. 6 and 7) attached to the opposite distal ends of the internal tubes 18, such as by threaded fasteners or welding, so as to firmly secure the hydraulic fluid accumulators 20 within of the pressure vessel assembly 10. As illustrated, each of the cover members 25 is provided with a plurality of cooling holes 27 allowing cooling flow through the cooling passage within the internal tube 18.

In an assembled condition, the end members 15 and 16 are inserted into the cylindrical housing 14 and aligned such as to be parallel to each other and perpendicular to the central axis 13 of the housing 14. The end members 15 and 16 are recessed sufficiently such that sufficient weld material can be applied between the raised flange **15*a* and 16*a* of the end plates 15 and 16, respectively, and an inner peripheral surface 14*a* of the cylindrical housing 14. At the time of alignment of the end plates 15 and 16, the punched circular holes 22 in both end members 15 and 16 must be aligned such that the internal tubes 18 may be passed through the completed cylindrical housing 14 and the end members 15, 16 and aligned flush with the cylindrical housing 14. Once the internal tubes 18 are positioned, sufficient weld is applied to the raised flange 15*a* and 16*a* of the end plates 15 and 16 and the distal ends of the cylindrical housing 14 so as to be leak tight to the desired pressure rating of the pressure vessel assembly 10. The pressure vessel assembly 10** shall be designed such that the material thickness and welds are sufficient to contain the working pressure of the system with an appropriate safety factor.

The pressure vessel assembly 10 of the pressurized fluid system 1 according to the preferred embodiment of the present invention further allows for efficient cooling of the housing 12 of the pressure vessel assembly 10 via forced airflow through the pressure vessel assembly 10. For this purpose, as illustrated in FIG. 1, the pressurized fluid system 1 includes a cooling fan 4 allowing an air flow F through the cooling passage defined by the clearance between the hydraulic fluid accumulator 20 and the internal tube 18 for forced cooling of the hydraulic fluid accumulators 20, the internal tubes 18 and the storage compartment 15 of the pressure vessel assembly 10 through the outer peripheral surface **18*a* of the internal tubes 18. Preferably, the cooling fan 4 is selectively driven by an electric motor 5 that, in turn, is selectively operated by an electronic controller (not shown). Thus, the air flow F of the cooling fan 4 provides a forced heat transfer from outer peripheral surfaces of the hydraulic accumulators 20**.

Moreover, according to the preferred embodiment of the present invention, the hydraulic fluid accumulators 20 are placed inside the internal tubes 18, centered and spaced inside the internal tubes 18 with at least one, preferably two, spiral wrappings 26 around the hydraulic fluid accumulators 20, as illustrated in FIG. 2. The nature of these wrappings 26 shall secure the hydraulic fluid accumulators 20 inside the internal tubes 18 and also allow for forced air circulation between an inner peripheral surface of the internal tubes 18 and an outer peripheral surface of the hydraulic fluid accumulators 20. Thus, the spiral wrappings 26 increase efficiency of the cooling of the hydraulic accumulators 20 and the working hydraulic fluid 17 within the storage compartment 11 of the pressure vessel assembly 10 by contributing to both the turbulence of the forced air flow F and serving to lengthen the path that the forced air flow F and therefore increase the time in which the forced air flow F and the internal tubes 18 and the accumulators 18 are in contact, thus increasing heat transfer. Preferably, the spiral wrappings 26 are made of an elastomeric material for dampening vibrations of the hydraulic accumulators 20 within the internal tubes 18.

Furthermore, a number of internal baffles 28 within the outer casing 12 are employed to increase a rate of thermal conduction from the working hydraulic fluid 17 within the storage compartment 11 of the pressure vessel assembly 10 to the internal tubes 18, reduce the amount of the hydraulic fluid movement within the storage compartment 11, and strengthen the pressure vessel assembly 10. It will be appreciated by those of ordinary skill in the art that arrangement of the internal baffles 28 can be varied to accommodate various angles of inclination of the motor vehicle.

The entire pressurized fluid system 1 is scaled such that sufficient working hydraulic fluid 17 may be contained within the storage compartment 11 of the pressure vessel assembly 10 between the inner peripheral surface 14*a* of the housing 14, the outer peripheral surface 18*a* of the internal tubes 18, and the end members 15 and 16 to allow the accumulators 20 to be charged with fluid.

Care shall be used in the selection of the materials and thickness of the pressure vessel elements to optimize both the pressure capacity as well as the heat transfer capacity of the pressure vessel assembly 10.

The cylindrical design of the pressure vessel assembly 10 also optimizes pressure capacity as a function of system weight. The flat end members 15 and 16 with the raised lips 15*a* and 16*a*, respectively, around the circumference strengthen the external connection to the cylindrical housing 12 as well as the connections to the internal tubes 18.

The design also allows for increased protection of the hydraulic fluid accumulators 20. This protection consists of the cylindrical housing 14, the working hydraulic fluid 17, and the internal tubes 18, as well as the separation distances. The design is intended to increase the protection of the charged accumulators 20 from ballistic penetration. In addition to this protection the design also allows for the re-direction of any fluid discharged from the punctured accumulator. The nature of the design directs the flow of any working fluid out the ends of the pressure vessel assembly 10. Prudent placement/orientation of the complete system would direct any expelled fluid flow in a safe direction.

Therefore, the integrated pressurized fluid system in accordance with the present invention includes a novel pressure vessel assembly comprising an enclosed outer casing, at least one internal tube extending within the casing, at least one fluid accumulator disposed within the at least one internal tube, and at least one cooling passage provided within the at least one internal tube adjacent to the at least one fluid accumulator for receiving a flow of a cooling fluid therethrough for cooling the at least one fluid accumulator.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A pressure vessel assembly for a pressurized fluid system, said pressure vessel assembly comprising:

an enclosed outer casing;

at least one hydraulic fluid accumulator disposed within said outer casing;

a compartment within said pressure vessel assembly between said outer casing and said at least one hydraulic fluid accumulator, said compartment at least partially filled with a hydraulic working fluid;

said compartment being in fluid communication with said at least one hydraulic fluid accumulator so as to selectively transfer said hydraulic working fluid between said compartment and said at least one hydraulic fluid accumulator;

a pressurized gas reservoir external to said outer casing, said pressurized gas reservoir being in fluid communication with said compartment within said outer casing for pressurizing said hydraulic working fluid within said compartment in said outer casing; and at least one internal tube extending within said outer casing so that said at least one hydraulic fluid accumulator being disposed within said at least one internal tube with a clearance;

said outer casing including a substantially tubular housing and end members secured at opposite distal ends of said housing.

2. The pressure vessel assembly as defined in claim 1, wherein said compartment includes at least one internal baffle.

3. The pressure vessel assembly as defined in claim 1, wherein said hydraulic working fluid is oil.

4. The pressure vessel assembly as defined in claim 1, wherein said at least one internal tube extends between said end members.

5. The pressure vessel assembly as defined in claim 1, wherein said at least one internal tube extends through said end members.

6. The pressure vessel assembly as defined in claim 1, wherein said outer casing includes at least one internal baffle.

7. The pressure vessel assembly as defined in claim 1, wherein said pressurized fluid system includes a hydraulic machine having a first port fluidly connected to said at least one hydraulic fluid accumulator and a second port fluidly connected to working fluid in said compartment.

* * * * *